(12) United States Patent
Frank

(10) Patent No.: US 11,606,237 B2
(45) Date of Patent: *Mar. 14, 2023

(54) MAXIMUM POWER REDUCTION FOR NON-CONTIGUOUS ALLOCATION

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,729

(22) Filed: Sep. 13, 2021

(65) Prior Publication Data

US 2021/0409250 A1   Dec. 30, 2021

Related U.S. Application Data

(63) Continuation of application No. 16/921,797, filed on Jul. 6, 2020, now Pat. No. 11,121,898, which is a
(Continued)

(51) Int. Cl.
*H04L 27/26* (2006.01)
*H04L 5/00* (2006.01)
(Continued)

(52) U.S. Cl.
CPC ........ *H04L 27/2614* (2013.01); *H04L 5/0012* (2013.01); *H04L 5/0041* (2013.01);
(Continued)

(58) Field of Classification Search
CPC ... H04L 27/2614; H04L 27/2605; H04L 5/00; H04W 72/0413; H04W 52/362; H04W 52/226; H04W 52/146
(Continued)

(56) References Cited

U.S. PATENT DOCUMENTS 8,879,493 B2    11/2014  Lim et al.
11,121,898 B2 *  9/2021  Frank ............... H04W 52/146
(Continued)

OTHER PUBLICATIONS

Motorola Mobility, "Almost-Contiguous A-MPR for Band 42 CA_NS-08", 3GPP TSG RAN WG4 Meeting #76, R4-155081, Aug. 24-28, 2015, pp. 1-11.
(Continued)

*Primary Examiner* — Don N Vo
(74) *Attorney, Agent, or Firm* — Kunzler Bean & Adamson

(57) ABSTRACT

Apparatuses, methods, and systems are disclosed for determining a maximum power reduction for non-contiguous radio resource allocations. One apparatus includes a processor that receives a non-contiguous resource allocation and calculates a fraction of resource block punctured from a smallest containing contiguous allocation ("SCCA"). Here, the SCCA is the smallest set of contiguous resource blocks that encompasses the non-contiguous resource allocation. The processor determines a first additional maximum power reduction for the non-contiguous resource allocation in response to the fraction of punctured resource blocks being less than a threshold value. The apparatus includes a transceiver that transmits an uplink signal on the non-contiguous resource allocation using the first additional maximum power reduction in response to the fraction of punctured resource blocks being less than the threshold value.

20 Claims, 10 Drawing Sheets

Related U.S. Application Data continuation of application No. 16/254,383, filed on Jan. 22, 2019, now Pat. No. 10,708,103.

(60) Provisional application No. 62/619,993, filed on Jan. 22, 2018.

(51) Int. Cl.
  *H04W 52/14* (2009.01)
  *H04W 52/36* (2009.01)
  *H04W 72/04* (2023.01)
  *H04W 52/22* (2009.01)

(52) U.S. Cl.
  CPC ........ *H04L 5/0053* (2013.01); *H04L 27/2605* (2013.01); *H04W 52/146* (2013.01); *H04W 52/362* (2013.01); *H04W 72/0413* (2013.01); *H04W 52/226* (2013.01)

(58) Field of Classification Search
  USPC ................................................ 375/260, 267
  See application file for complete search history.

(56) References Cited

U.S. PATENT DOCUMENTS

| | | | |
|---|---|---|---|
| 2013/0028214 A1 | 1/2013 | Imamura et al. | |
| 2015/0156638 A1* | 6/2015 | Yerramalli | H04L 5/0041 |
| | | | 455/454 |
| 2015/0304962 A1 | 10/2015 | Fabien et al. | |
| 2016/0309470 A1* | 10/2016 | Yl | H04W 72/0446 |
| 2016/0345298 A1 | 11/2016 | Frank | |
| 2017/0142733 A1 | 5/2017 | Wang et al. | |
| 2018/0132197 A1 | 5/2018 | Lin et al. | |
| 2018/0368169 A1* | 12/2018 | Jung | H04L 1/1861 |

OTHER PUBLICATIONS

Nokia, Nokia Shanghai Bell, "Almost contiguous allocation MPR for CP-OFDM", 3GPP TSG-RAN WG4 Meeting #AH1801, R4-1800060, Jan. 22-26, 2018, pp. 1-4.

Motorola Mobility, "Considerations for Almost Contiguous MPR", 3GPP TSG RAN WG4 Meeting #78, R4-1709851, Sep. 18-22, 2017, pp. 1-5.

Motorola Mobility, "A-MPR for CA with Almost-Contiguous Resource Allocations and CA-NS signalling", 3GPP TSG RAN WG4 Meeting #74, R4-150925, Feb. 9-13, 2015, pp. 1-9.

3GPP, "Evolved Universal Terrestrial Radio Access (E-UTRA); User Equipment (UE) radio transmission and reception (3GPP TS 36.101 version 14.3.0 Release 14)", ETSI TS 136 101, V14.3.0, Apr. 2017, pp. 1-1371.

3GPP, "Technical Specification Group Radio Access Network; NR; User Equipment (UE) radio transmission and reception; Part 1: Range 1 Standalone (Release 15)", 3GPP TS 38.101-1, VO.2.0, 2017-1, pp. 1-41.

* cited by examiner

700

| Parameters | Region A | | Region B | | Region C |
|---|---|---|---|---|---|
| RB_START | 1-12 | | 13-18 | 19-42 | 43-49 |
| L_CRB [RBs] | 6-8 | 1-5 and 9-50 | ≥8 | ≥18 | ≤2 |
| A-MPR [dB] | ≤8 | ≤12 | ≤12 | ≤6 | ≤3 |

A-MPR for network signaling of "NS_07"

| Channel bandwidth [MHz] | Parameters | | | |
|---|---|---|---|---|
| 5 | $F_C$ [MHz] | ≤ 2500.5 | | > 2500.5 |
| | $RB_{START}$ | 0 - 8 | 9 – 24 | 0 - 24 |
| | $L_{CRB}$ [RBs] | > 0 | > 0 | > 0 |
| | A-MPR [dB] | ≤ 2 | 0 | 0 |
| 10 | $F_C$ [MHz] | ≤ 2504 | | > 2504 |
| | $RB_{START}$ | 0 - 8 | 9-35 | 36 – 49 | 0 - 49 |
| | $L_{CRB}$ [RBs] | ≤ 15 | > 15 and < 25 | ≥ 25 | N/A | > 0 |
| | $RB_{START} + L_{CRB}$ [RBs] | N/A | N/A | N/A | ≥ 45 | N/A |
| | A-MPR [dB] | ≤ 3 | ≤ 2 | ≤ 1 | 0 |
| 15 | $F_C$ [MHz] | ≤ 2510.8 | | > 2510.8 |
| | $RB_{START}$ | 0 - 13 | 14 – 59 | 60 – 74 | 0 - 74 |
| | $L_{CRB}$ [RBs] | ≤ 18 or ≥ 36 | > 18 and < 36 | N/A | > 0 |
| | $RB_{START} + L_{CRB}$ [RBs] | N/A | N/A | ≥ 62 | N/A |
| | A-MPR [dB] | ≤ 3 | ≤ 1 | 0 |
| 20 | $F_C$ [MHz] | ≤ 2517.5 | | > 2517.5 |
| | $RB_{START}$ | 0 – 22 | 23 – 76 | 77 – 99 | 0 - 99 |
| | $L_{CRB}$ [RBs] | ≤ 18 or ≥ 40 | > 18 and < 40 | N/A | > 0 |
| | $RB_{START} + L_{CRB}$ [RBs] | N/A | N/A | ≥ 86 | N/A |
| | A-MPR [dB] | ≤ 3 | ≤ 1 | 0 |

A-MPR for network signaling of "NS_04" for Power Class 3 UE

FIG. 7B

MAXIMUM POWER REDUCTION FOR NON-CONTIGUOUS ALLOCATION

CROSS-REFERENCE TO RELATED APPLICATIONS

This application claims priority to U.S. patent application Ser. No. 16/921,797 entitled "MAXIMUM POWER REDUCTION FOR NON-CONTIGUOUS ALLOCATION" and filed on Jul. 6, 2020 for Colin Frank, which claims priority to U.S. patent application Ser. No. 16/254,383 entitled "MAXIMUM POWER REDUCTION FOR NON-CONTIGUOUS ALLOCATION" and filed on Jan. 22, 2019 for Colin Frank, which claims priority to U.S. Provisional Patent Application No. 62/619,993 entitled "MAXIMUM POWER REDUCTION FOR NON-CONTIGUOUS ALLOCATIONS" and filed on Jan. 22, 2018 for Colin Frank, which applications are incorporated herein by reference for all purposes. See MPEP § 213.

FIELD

The subject matter disclosed herein relates generally to wireless communications and more particularly relates to determining a maximum power reduction for non-contiguous radio resource allocations.

BACKGROUND

The following abbreviations are herewith defined, at least some of which are referred to within the following description.

The following abbreviations are herewith defined, at least some of which are referred to within the following description: Third Generation Partnership Project ("3GPP"), Fifth-Generation Core ("5GC"), Access and Mobility Management Function ("AMF"), Access Stratum ("AS"), Adjacent Channel Leakage Ratio ("ACLR"), Bandwidth Adaptation ("BA"), Bandwidth Part ("BWP"), Binary Phase Shift Keying ("BPSK"), Buffer Status Report ("BSR"), Carrier Aggregation ("CA"), Clear Channel Assessment ("CCA"), Cyclic Prefix ("CP"), Common Search Space ("C-SS"), Control Element ("CE"), Cyclical Redundancy Check ("CRC"), Channel State Information ("CSI"), Common Search Space ("CSS"), Data Radio Bearer ("DRB," e.g., carrying user plane data), Demodulation Reference Signal ("DM-RS"), Discontinuous Reception ("DRX"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), Evolved Packet Core ("EPC"), Evolved UMTS Terrestrial Radio Access Network ("E-UTRAN"), General Packet Radio Service ("GPRS"), Global System for Mobile Communications ("GSM"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Logical Channel ("LCH"), Long Term Evolution ("LTE"), Master Information Block ("MIB"), Multiple Access ("MA"), Medium Access Control ("MAC"), Mobility management Entity ("MME"), Narrowband ("NB"), Next Generation (e.g., 5G) Node-B ("gNB"), Next Generation Radio Access Network ("NG-RAN"), New Radio ("NR", e.g., 5G radio access), Orthogonal Frequency Division Multiplexing ("OFDM"), Packet Data Convergence Protocol ("PDCP"), Primary Cell ("PCell"), Physical Broadcast Channel ("PBCH"), Packet Data Network ("PDN"), Protocol Data Unit ("PDU"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Link Control ("RLC"), Radio Link Failure ("RLF"), Radio Link Monitoring ("RLM"), Radio Network Temporary Identifier ("RNTI"), Radio Resource Control ("RRC"), Random-Access Procedure ("RACH"), Random Access Response ("RAR"), Radio Network Temporary Identifier ("RNTI"), Reference Signal ("RS"), Reference Signal Received Power ("RSRP"), Remaining Minimum System Information ("RMSI"), Resource Block Assignment ("RBA"), Resource Spread Multiple Access ("RSMA"), Round Trip Time ("RTT"), Receive ("RX"), Sparse Code Multiple Access ("SCMA"), Scheduling Request ("SR"), Signaling Radio Bearer ("SRB," e.g., carrying control plane data), Secondary Cell ("SCell"), Secondary Cell Group ("SCG"), Shared Channel ("SCH"), Signal-to-Interference-Plus-Noise Ratio ("SINR"), Serving Gateway ("SGW"), Service Data Unit ("SDU"), Sequence Number ("SN"), Session Management Function ("SMF"), System Information ("SI"), System Information Block ("SIB"), Synchronization Signal ("SS"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("the UE"), Uplink ("UL"), User Plane ("UP"), Universal Mobile Telecommunications System ("UMTS"), Uplink Pilot Time Slot ("UpPTS"), Ultra-reliability and Low-latency Communications ("URLLC"), Wireless Local Area Network ("WLAN"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In LTE, maximum power reduction is defined for the UE DFT-s-OFDM uplink transmission in order to enable the UE to meet emissions requirements such as the spectral emissions mask (SEM), adjacent channel leakage requirements UTRA ACLR1, UTRA ACLR2, E-UTRA ACLR, NR ACLR, and the spurious emissions requirements. Additional maximum power reduction (A-MPR) is allowed when additional emission constraints are signaled using network signaling (NS). MPR is defined for the UE in order to enable the UE uplink transmission to meet the SEM, UTRA_ACLR1, UTRA_ACLR2, E-UTRA_ACLR, NR ACLR and spurious emissions requirements.

BRIEF SUMMARY

Methods for determining a maximum power reduction for non-contiguous radio resource allocations are disclosed. Apparatuses and systems also perform the functions of the methods. The methods may also be embodied in one or more computer program products comprising executable code.

In one embodiment, a method for determining a maximum power reduction for non-contiguous radio resource allocations includes determining a non-contiguous resource allocation for a User Equipment ("UE") in a wireless communication system, the non-contiguous resource allocation comprising a smallest containing contiguous allocation ("SCCA") and a plurality of resource blocks punctured from the SCCA, where the SCCA is a smallest set of contiguous resource blocks that encompasses the non-contiguous resource allocation. The method includes transmitting the non-contiguous resource allocation to the UE and receiving, from the UE, an uplink signal on the non-contiguous resource allocation, where the uplink signal is transmitted using a first additional maximum power reduction for the non-contiguous resource allocation in response to a fraction of punctured resource blocks from the SCCA being less than a threshold value.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7B is a table illustrating one embodiment of A-MPR requirements for network signaling of "NS_04";

DETAILED DESCRIPTION

Figure 1:
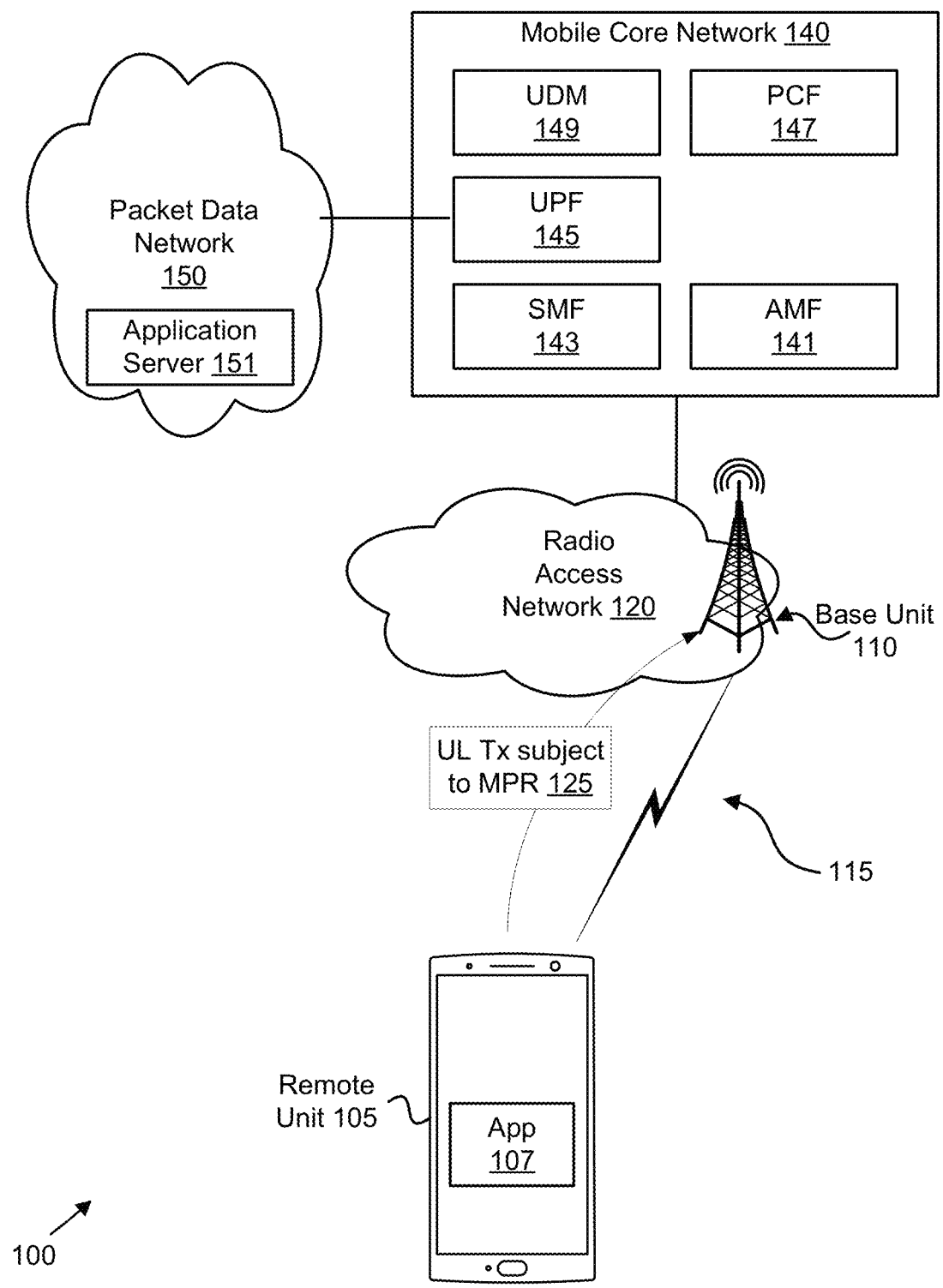
FIG. 1 is a block diagram illustrating one embodiment of a wireless communication system for determining a maximum power reduction for non-contiguous radio resource allocations.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

As noted above, 5G NR supports BWP, namely a group of contiguous PRBs whose collective bandwidth is smaller than or equal to the maximum UE bandwidth capability, but at least as large as a bandwidth of a SS/PBCH block. Different UEs' BWPs may fully or partially overlap, and it is up to a network entity, e.g., a gNodeB ("gNB") or other suitable RAN node, to coordinate scheduling of different UEs' BWPs. Configuration parameters of a BWP may include numerology (e.g., subcarrier spacing), a frequency location (e.g., center frequency), and a bandwidth (e.g., number of PRBs). A given BWP may or may not contain a SS/PBCH block.

Multiple SS/PBCH blocks can be transmitted within a bandwidth of a carrier. However, from UE perspective, a cell is associated with a single SS/PBCH block in frequency domain. Further, a cell-defining SS/PBCH block has an associated essential system information block(s), for example, System Information Block Type1 ("SIB1") and/or System Information Block Type2 ("SIB2") which includes, so called, 'remaining minimum system information ("RMSI")', system information not included in a master information block ("MIB") but essential to accessing to a cell. Multiple cell-defining SS/PBCH blocks associated with a common NE and transmitted in the bandwidth of the carrier may or may not have common system information.

System information ("SI") messages, each of which includes at least one system information block, may be transmitted within periodically occurring time domain windows (referred to as SI-windows) using dynamic scheduling. Each SI message is associated with a SI-window and the SI-windows of different SI messages may or may not overlap. A SI-window length may be configurable and may or may not be common for all SI messages. Within a given SI-window, a corresponding SI message can be transmitted a number of times. UE can acquire detailed time and frequency domain scheduling and other information from decoding physical downlink control channel ("PDCCH") addressed by a system information-radio network temporary identifier ("SI-RNTI"). For a secondary cell ("SCell"), a network entity provides UE with the required SI by dedicated signaling. Upon change of relevant SI, the network entity releases and adds back the concerned SCell with the updated SI for the UE. However, signaling of updated SI via cell release and addition procedures may not be suitable for a primary cell ("PCell") or primary secondary cell ("PSCell").

Disclosed herein are methods, apparatuses, systems, and computer-program products to perform (re)-acquiring system information ("SI") within a wideband carrier, wherein the wideband carrier refers to a carrier which includes one or more cell-defining SS/PBCH blocks associated with a common network entity (e.g., a base station).

FIG. 1 depicts a wireless communication system 100 for determining a maximum power reduction for non-contiguous radio resource allocations, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140. Note that UL transmissions 125 by the remote unit 105 may be subject to a maximum power reduction to comply with various emissions requirements. Here, the emission requirements vary from one jurisdiction to another.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

While FIG. 1 depicts components of a 5G RAN and a 5G core network, the described embodiments for determining a maximum power reduction for non-contiguous radio resource allocations apply to other types of communication networks, including IEEE 802.11 variants, UMTS, LTE variants, CDMA 2000, Bluetooth, and the like. For example, in an LTE variant, the AMF 135 may be mapped to an MME, the SMF mapped to a control plane portion of a PGW, the UPF map to a STW and a user plane portion of the PGW, etc.

Generally, the present disclosure describes systems, methods, and apparatus for determining a maximum power reduction for non-contiguous radio resource allocations, particularly in a network that uses CP-OFDM. As used herein, a "non-contiguous resource allocation" is defined as a resource allocation which is not a contiguous resource allocation. Moreover, a "contiguous resource allocation" is defined as a resource allocation of consecutive resource blocks within one carrier or across contiguously aggregated carriers. Note that the gap between contiguously aggregated carriers due to the nominal channel spacing is allowed within the definition of a "contiguous resource allocation."

For LTE, only the DFT-s-OFDM waveform is used for transmission of the uplink PUSCH. However, in NR (e.g., 3GPP 5G RAT), the UE can transmit the uplink using DFT-s-OFDM as in LTE, or alternatively, can transmit using cyclic prefix OFDM (CP-OFDM). In order to meet the ACLR emissions requirement, MPR is to be specified for both DFT-s-OFDM and CP-OFDM.

In various embodiments, the allowed MPR is defined based on a modulation and waveform used for the UL PUSCH. Here, the waveform may be DFT-s-OFDM or CP-OFDM. Examples of modulations include: π/2 BPSK, QPSK, 16 QAM, 64 QAM, and 256 QAM. Note that the following parameters may be used to specify valid RB allocation ranges for Outer and Inner RB allocations: $L_{CRBmax}$, $RB_{StartLow}$, $RB_{StartHigh}$, and $RB_{StartInner}$.

These parameters may be defined as follows: $L_{CRBmax}$ refers to the maximum number of RB for a given Channel bandwidth and sub-carrier spacing derived from spectrum utilization. $RB_{StartLow}$ is equal to $L_{CRB}/2$ rounded down to next integer with floor at 1. $RB_{StartHigh}$ is equal to $L_{CRBmax}-RB_{StartLow}-L_{CRB}$. $RB_{StartInner}$ refers to valid $RB_{START}$ values for Inner RB allocations.

Here, the Inner RB allocation range is specified as follows: Inner RB allocations are $L_{CRB}/2$ away from each edge of the maximum RB allocation for all $L_{CRB} \leq L_{CRBmax}/2$ rounded up to the next integer. For $L_{CRB} \leq L_{CRBmax}/2$ rounded up to the next integer, $RB_{StartLow} \leq RB_{StartInner} \leq RB_{StartHigh}$. Additionally, the Outer RB allocation range is all allocations which are not Inner RB allocations.

For current 5G systems, MPR is only defined for contiguous RB allocations. Here, the MPR is a function of the waveform type, either DFT-s-OFDM or CP-OFDM, and the modulation type which can be PI/2 BPSK, QPSK, 16 QAM, 64 QAM, or 256 QAM.

In 3GPP New Radio ("NR"), a bandwidth part consisting of a group of contiguous physical resource blocks ("PRBs") is used in 3GPP New Radio ("NR") to support at least: reduced user equipment ("UE") bandwidth ("BW") capability, UE BW adaptation, frequency division multiplexing ("FDM") of multiple numerologies (subcarrier spacings), and use of non-contiguous spectrum. Moreover, the use of bandwidth part allows the UE to reduce power consumption. It should be noted that bandwidth parts are UE specific and are not restricted to the allowed channel carrier bandwidths in NR, such as 5, 10, 15, 20, 25, 30, 40, 45, 50, 60, 80, 90, or 100 MHz. It should also be noted that each bandwidth part may have its own PUCCH resources which can be used for the transmission of acknowledgements or for the transmission of channel state feedback, such as Precoding Matrix Indicators, Rank Indicators, and/or Channel Quality Information ("PMI/RI/CQI").

In some embodiments, a remote unit 105 may use a maximum power reduction to meet emissions requirements such as the spectral emissions mask (SEM), adjacent channel leakage requirements UTRA ACLR1, UTRA ACLR2, E-UTRA ACLR, NR ACLR, and the spurious emissions requirements. Additional maximum power reduction (A-MPR) is allowed when additional emission constraints are signaled using network signaling.

For example, the remote unit 105 may identify a smallest contiguous allocation containing the non-contiguous allocation and a fraction of RBs punctured from the smallest containing contiguous allocation, e.g., due to PUCCH for other remote units 105. Moreover, the remote unit 105 may identify a threshold α and determine whether the fraction of RBs punctured from the smallest containing contiguous allocation is less than the threshold α. Where the fraction is less than the threshold α, the remote unit 105 may determine an MPR for the non-contiguous allocation, wherein the MPR for the non-contiguous allocation is based on the MPR for the smallest containing contiguous allocation.

Described herein are UE behavior for determining a maximum power reduction for a non-contiguous resource allocation, particularly for a CP-OFDM allocation in a 5G wireless communication system, such as one compliant with the 3GPP NR.

Figure 2:
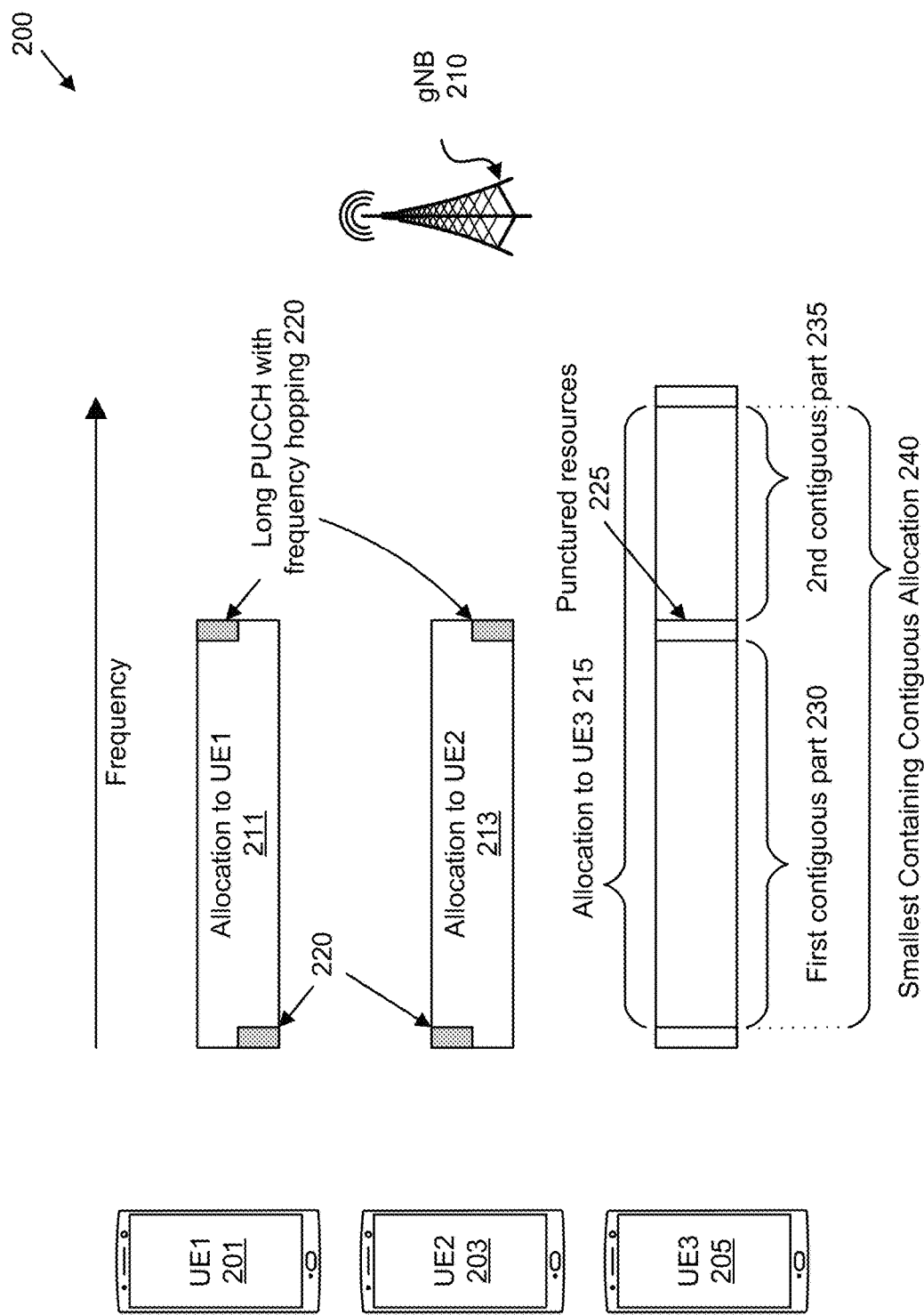
FIG. 2 is a block diagram illustrating one embodiment of a network architecture for determining a maximum power reduction for non-contiguous radio resource allocations.

FIG. 2 depicts a network architecture 200 comprising a gNB 210 (or other suitable base station) and multiple UEs, namely a first UE ("UE1") 201, a second UE ("UE2") 203, and a third UE ("UE3") 205. to different UEs, according to various embodiments of the disclosure. Here, three UEs are being served in the illustrated frequency band: a first UE 201 having a narrowband allocation 211, a second UE 203 also having a narrowband allocation 213, and a third UE 205 having a wideband allocation 215.

Note that the narrowband allocations 211 and 213 include long PUCCH 220 with frequency hopping. Because of the need for the narrowband UE to transmit on its PUCCH even when the narrowband UE is not given an uplink PUSCH allocation, it will not in general be possible to allocate a contiguous full-bandwidth block of resources to the wideband third UE 205. The PUCCH requirement of narrowband UEs results in punctured resources 225 in the wideband allocation 215. This puncturing results in a first contiguous part 230 and a second contiguous part 235 in the wideband allocation 215.

Thus, there are two options for the allocation to the third UE 205: the first option is to allocate a non-contiguous wideband allocation in which the narrowband UE PUCCH resources have been punctured from the third UE 205's allocation; the second option is to allocation only contiguous RBs (e.g., one of the first contiguous part 230 and the second contiguous part 235), however, this will result in a smaller bandwidth allocation. Unless a non-contiguous allowed MPR or A-MPR is defined for NR CP-OFDM, it is not possible to give the wideband UE a non-contiguous wideband allocation from which the narrowband UE PUCCH resources have been punctured. Accordingly, techniques for defining allowed MPR for non-contiguous allocations are disclosed herein.

One way to define MPR or A-MPR for a non-contiguous allocation is to use the contiguous MPR (or A-MPR) when the non-contiguous allocation is an almost-contiguous allocation. Here, the assumption is that the number of punctured RBs within the otherwise contiguous allocation are limited so that the normal MPR is sufficient. As used herein, an "almost-contiguous" allocation refers to an allocation where the number of punctured RBs within the smallest containing contiguous allocation are limited. A non-contiguous allocation may be determined to be an "almost-contiguous" allocation if the amount of punctured resource blocks meets certain criteria, such as a ratio of punctured RBs to the number of RBs in the smallest containing contiguous allocation being less than a threshold, the size (number) of Punctured RBs being less than a threshold, the largest number of contiguously punctured RBs being less than a threshold, the location of the allocation (e.g., inner or outer) being in a certain location in the carrier/channel, the modulation associated with the allocation being a certain type, the number of RBs in the smallest containing contiguous allocation being within a predetermined amount of the channel bandwidth, and other criteria discussed herein.

In one embodiment, a CP-OFDM allocation is determined to be an almost-contiguous if $L_{CRB}$ of the smallest containing contiguous allocation satisfies $L_{CRB} > L_{CRBmax}/FFS$ of the given channel bandwidth and the number of resource blocks which are not transmitted within the smallest containing contiguous allocation are less than or equal to $L_{CRB}/FFS$. In such embodiments, the allowed MPR for the almost-contiguous allocation is that of a contiguous block of RBs starting and ending with the same RBs as the almost-contiguous allocation.

Above, $L_{CRBmax}$ is intended to mean the maximum number of RBs allowed for the given channel bandwidth. For a contiguous allocation, $L_{CRB}$ is the number of allocated RBs. For a non-contiguous allocation, $L_{CRB}$ may be defined to be the number of RBs of the smallest containing contiguous allocation. As used herein, the "smallest containing contiguous allocation" refers to a contiguous allocation that encompasses the non-contiguous allocation. One example of a smallest containing contiguous allocation is shown at 240. In certain embodiments, a smallest containing contiguous allocation ("SCCA") is a contiguous allocation having the same starting RBs and ending RBs as the non-contiguous allocation.

Figure 3:
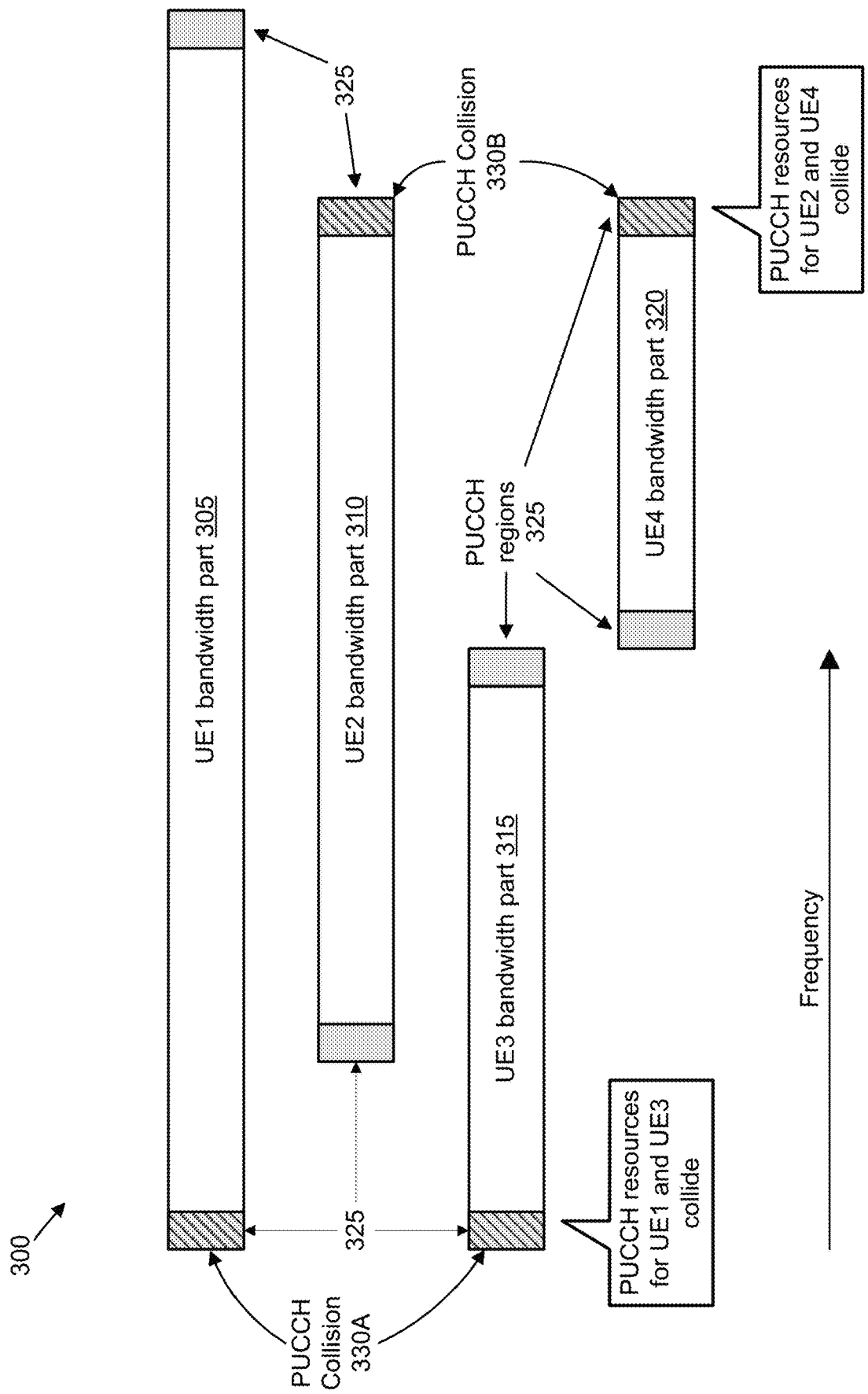
FIG. 3 is a block diagram illustrating one embodiment of allocations of bandwidth parts to a plurality of UEs.

FIG. 3 depicts bandwidth parts 300 for different UEs, according to various embodiments of the disclosure. Here, the bandwidth parts ("BWPs") include a first BWP 305 of a first UE ("UE1"), a second BWP 310 of a second UE ("UE2"), a third BWP 315 of a third UE ("UE3"), and a fourth BWP 320 of a fourth UE ("UE4"). Note that FIG. 3 may be an over-simplified representation of the concept of bandwidth part. Because BWPs are UE specific, there is no requirement that BWPs of different UE's be aligned.

As depicted in FIG. 3, the bandwidth parts for different UE's may have different widths and the boundaries may not be aligned. Furthermore, some bandwidth parts may be fully contained within other bandwidth parts (e.g., the BWPs 310 and 320 are fully contained within the BWP 305). From FIG. 3, it is apparent that the left PUCCH region for the UE1 and the UE3 overlap so that the PUCCH resources for these two UEs collide (PUCCH collision 330A), and a similar situation exists for the right PUCCH region of the UE2 and the UE3 (PUCCH collision 330B). In one embodiment, this problem may be alleviated by overprovisioning (moving inwards) the PUCCH region, e.g., of the UE2. The point of this observation is to note that for bandwidth parts, the PUCCH region may not be in the edge RBs of the bandwidth part.

In some embodiments, in order for normal MPR to apply, it must be that $L_{CRB} > $a portion of the $L_{CRBmax}$ for the given channel bandwidth. In one example, $L_{CRBmax}/X$ for the given channel bandwidth, where the value of X is predefined in the wireless network. However, the above does not allow non-contiguous allocations for bandwidth parts containing other bandwidth parts either in whole or in part as is shown in above.

Note that, in FIG. 3, the bandwidth part for the UE2 is punctured by the PUCCH region of the bandwidth parts for the UE3 and UE4. Similarly, the bandwidth part for the UE3 is punctured by the PUCCH region of bandwidth part for the UE2. Thus, for the more general cases illustrated in FIG. 3, it may not be desirable to require that $L_{CRB} > L_{CRBmax}/X$, as with this requirement, it may not be possible to allow non-contiguous allocations for smaller bandwidth parts.

Because different emissions constraints limit the transmit power (and thus determine the needed MPR), it will in general be true that a greater fraction of RBs can be punctured from the contiguous RB allocations located in some parts of the table of 3GPP TS 38.101 while still meeting emissions requirements, than can be punctured from the contiguous RB allocations located in other parts of the table.

In various embodiments, the UE 205 may support non-contiguous MPR for CP-OFDM based on the MPR for the smallest contiguous allocation containing the non-contiguous allocation. For a non-contiguous allocation of span $L_{CRB}$, let $L_{CRB}$ denote the number of RBs in the smallest contiguous allocation containing the non-contiguous allocation.

MPR is defined for the non-contiguous allocation if the fraction of RBs punctured from the smallest containing contiguous allocation is less than a threshold α which is strictly less than 1. Let $N_{RB\_GAP}$ represent the number of unallocated RBs between allocated RBs (e.g., the number of punctured RBs) and let $N_{RB\_ALLOC}$ is number of allocated RBs. The non-contiguous allocation may be considered an almost-contiguous allocation, and have a defined allowed MPR, if the following is satisfied:

$$N_{RB\_GAP}/(N_{RB\_ALLOC}+N_{RB\_GAP}) \le \alpha \qquad \text{Equation 1}$$

Note that that quantity "$N_{RB\_GAP}+N_{RB\_ALLOC}$" represents the number of RBs in the smallest containing contiguous allocation ("SCCA"). Accordingly, the SCCA may be defined as follows:

$$N_{SCCA}=N_{RB\_ALLOC}+N_{RB\_GAP} \qquad \text{Equation 2}$$

In certain embodiments, Equation 1 may apply only if the size of the SCCA as above a minimum amount. Here, the minimum amount may be based on the subcarrier spacing of the non-contiguous allocation. In one embodiment, threshold α be 0.25 or less. In certain embodiments, the value of α may depend on whether the smallest containing contiguous allocation is an inner allocation or an outer allocation. In some embodiments, the threshold α may depend on the modulation of the non-contiguous allocation, e.g., QPSK, 16QAM, 64QAM, 256 QAM.

In certain embodiments, the value of α may depend on the center frequency of the carrier, $F_c$. In certain embodiments, the value of α may depend on $L_{CRB}$. In certain embodiments, the value of α may depend on the lowest index RB, $RB_{START}$. In certain embodiments, the value of a may depend on the NS value signaled.

Note that for some contiguous allocations, MPR may not be defined for any non-contiguous allocation resulting from puncturing the contiguous allocation. For example, if the SCCA is located in certain portions of the frequency band, then MPR may not be defined for the non-contiguous allocation. In one embodiment, the MPR is defined based on a starting (e.g., lowest) or ending (e.g., highest) resource block index of the allocation.

In various embodiments, the allowed MPR for the non-contiguous allocation may be allowed to increase by a value β dB relative to the allowed MPR for the SCCA. Here, the value β may be as large as the negative of 10 times the base 10 logarithm of the fraction of the $L_{CRB}$ RBs punctured. Here, the value of β is based on the ratio of RBs punctured. In certain embodiments, the value of β may be defined using a ceiling function to map the fraction of RBs punctured from the smallest containing contiguous allocation to a decibel value in steps of 0.5 dB as follows:

$$\beta = \lceil 10 \log_{10}(1 + N_{RB\_GAP}/N_{RB\_ALLOC}), 0.5 \rceil \text{ dB} \qquad \text{Equation 3}$$

Figure 4:
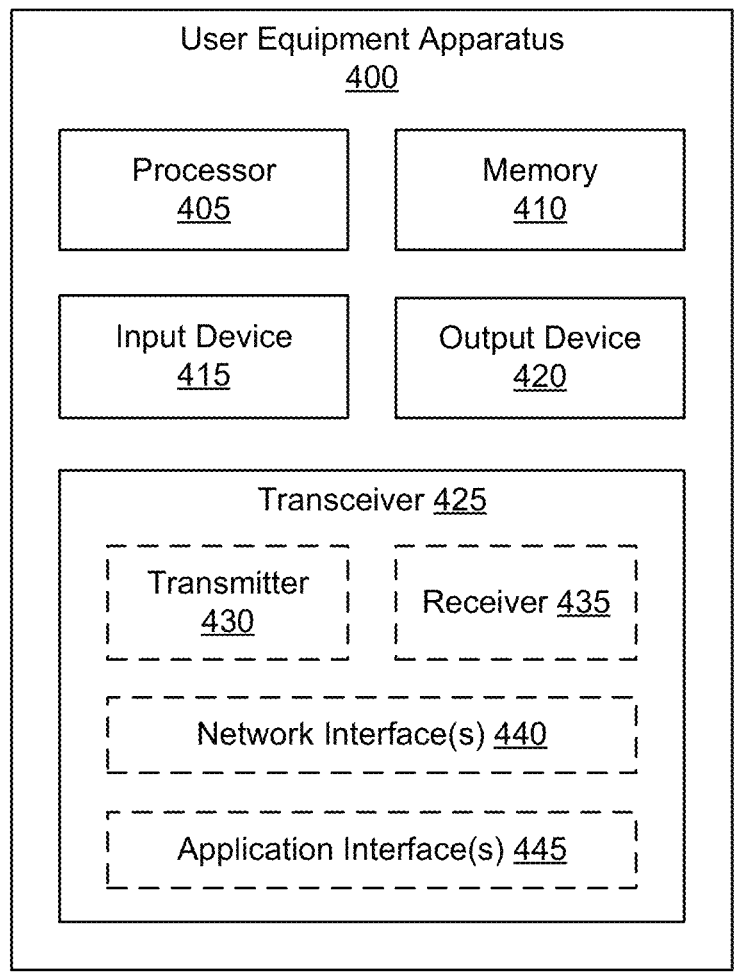
FIG. 4 is a diagram illustrating one embodiment of a user equipment apparatus for determining a maximum power reduction for non-contiguous radio resource allocations.

FIG. 4 depicts one embodiment of a user equipment apparatus 400 that may be used for determining a maximum power reduction for non-contiguous radio resource allocations. In various embodiments, the user equipment apparatus is used to implement one or more of the solutions described herein. The user equipment apparatus 400 may be one embodiment of the remote unit 105. Furthermore, the user equipment apparatus 400 may include a processor 405, a memory 410, an input device 415, an output device 420, and a transceiver 425.

In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

As depicted, the transceiver 425 includes at least one transmitter 430 and at least one receiver 435. In some embodiments, the transceiver 425 communicates with one or more cells (or wireless coverage areas) supported by one or more base units 121. In various embodiments, the transceiver 425 is operable on unlicensed spectrum. Moreover, the transceiver 425 may include multiple UE panels supporting one or more beams. Additionally, the transceiver 425 may support at least one network interface 440 and/or application interface 445. The application interface(s) 445 may support one or more APIs. The network interface(s) 440 may support 3GPP reference points, such as Uu, N1, PC5, etc. Other network interfaces 440 may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the transceiver 425 receives a non-contiguous resource allocation, e.g., from a gNB 210 in a wireless communication system. The gNB 210 may be one embodiment of the base unit 110, described above. Moreover, the processor 405 is configured to identify the non-contiguous resource allocation. In certain embodiments, the non-contiguous resource allocation contains a plurality of smaller contiguous resource allocations. Here, the non-contiguous resource allocation is contained within a smallest containing contiguous allocation ("SCCA"), such that the SCCA is defined as that smallest set of contiguous resource blocks that encompasses the non-contiguous resource allocation.

The processor 405 determines a maximum power reduction for the non-contiguous resource allocation based on whether a fraction of resource blocks punctured from the SCCA is less than a threshold α. Here, the value of α (alpha) may be predetermined or configured by the gNB 210. In various embodiments, the allowed MPR for the non-contiguous resource allocation is based on the allowed MPR for the SCCA. In various embodiments, the SCCA is a set of contiguous resource block that encompasses the non-contiguous resource allocation, wherein the non-contiguous resource allocation contains a plurality of smaller contiguous resource allocations.

In some embodiments, determining the MPR for the non-contiguous resource allocation includes selecting an allowed MPR defined for the SCCA in response to the fraction of resource blocks punctured from the SCCA being less than a threshold α. In further embodiments, determining the maximum power reduction for the non-contiguous resource allocation includes increasing a selected maximum power reduction for the SCCA by a value β (beta). In one embodiment, the value β is a function of the fraction of resource blocks punctured from the SCCA. In further embodiments, the value β is the negative of 10 times the base 10 logarithm of the fraction of resource blocks punctured from the SCCA.

However, the processor 405 may determine that no MPR is defined for the non-contiguous allocation if the fraction of resource blocks punctured from the SCCA is not less than the threshold value. Alternatively, the processor 405 may determine that the MPR of the non-contiguous allocation does not depend on the allowed MPR of the SCCA if the fraction of resource blocks punctured from the SCCA is not less than the threshold value. In such embodiments, the allowed MPR of the non-contiguous allocation may be determined using a lookup table, by network signaling, or the like.

In some embodiments, the transceiver 425 receives, from the wireless communication system, an indication of additional emission requirements, such that an additional MPR (e.g., A-MPR) is allowed. Here, the maximum power reduction (e.g., total MPR) for the non-contiguous resource allocation is further based on the indication. In various embodiments, the indication of additional emission requirements is received by NS signaling, for example by the gNB 210 sending a NS value.

In certain embodiments, the threshold α is based on the lowest resource block index of the allocation. In certain embodiments, the threshold α is based on a number of resource blocks in the SCCA. In certain embodiments, the threshold α is based on a center frequency of a carrier to which the non-contiguous resource allocation belongs. In certain embodiments, the threshold α is based on a modulation of the non-contiguous resource allocation.

Moreover, the processor 405 controls the transceiver 425 to transmit at least one uplink signal on the non-contiguous resource allocation using the determined maximum power reduction. In certain embodiments, transmitting the uplink signal(s) on the non-contiguous resource allocation using the maximum power reduction includes transmitting the uplink signal(s) using a cyclic prefix orthogonal frequency division multiplexing ("CP-OFDM") waveform.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to mobile operation and/or determining a maximum power reduction for non-contiguous radio resource allocations. For example, the memory 410 may store one or more MPR tables, resource allocations, and the like. In certain embodiments, the memory 410 also stores program code and related data, such as an operating system or other controller algorithms operating on the remote unit 105.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 includes at least transmitter 430 and at least one receiver 435. One or more transmitters 430 may be used to provide UL communication signals to a base unit 110, such as the UL transmissions described herein. Similarly, one or more receivers 435 may be used to receive DL communication signals from the base unit 110, as described herein. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
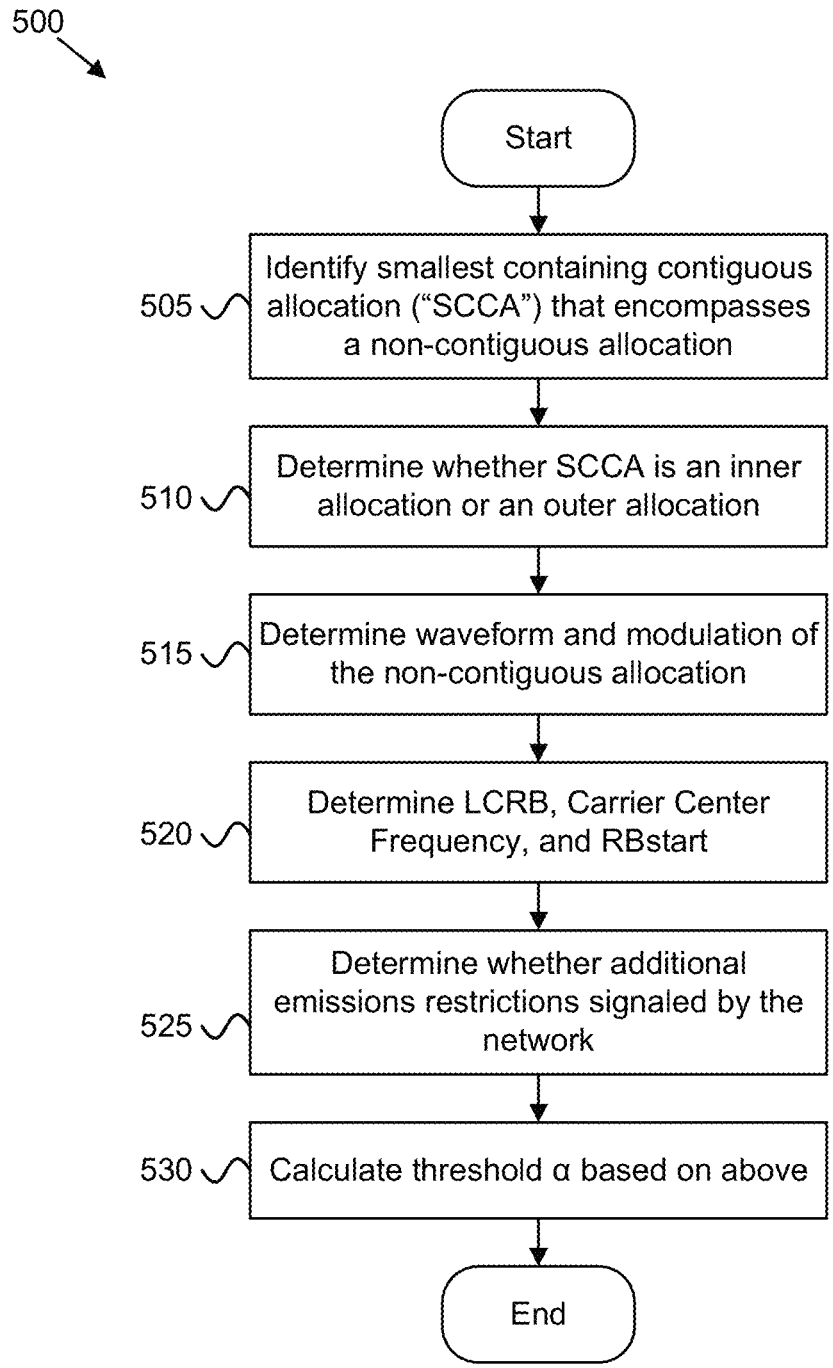
FIG. 5 is a diagram illustrating one embodiment of a procedure for determining if MPR is defined for a non-contiguous allocation.

FIG. 5 depicts one procedure 500 for determining a threshold α for a non-contiguous allocation. The procedure 500 begins with identifying 505 the smallest containing contiguous allocation ("SCCA") that encompasses a non-contiguous allocation. In some embodiments, the procedure 500 includes determining 510 whether SCCA is an inner allocation or an outer allocation. Such determination may be based on the lowest RB index of the SCCA. In certain embodiments, the procedure 500 includes determining 515 a waveform type and a modulation type of the non-contiguous allocation. In some embodiments, procedure 500 includes determining 520 $L_{CRB}$, Carrier Center Frequency ($F_C$), and $RB_{START}$ values for the non-contiguous allocation. Moreover, in certain embodiments the procedure 500 includes determining 525 whether additional emissions restrictions are signaled by the network. Based one or more of the above factors, the procedure 500 calculates 530 the value of a. The procedure 500 ends.

Figures 6, 7A:
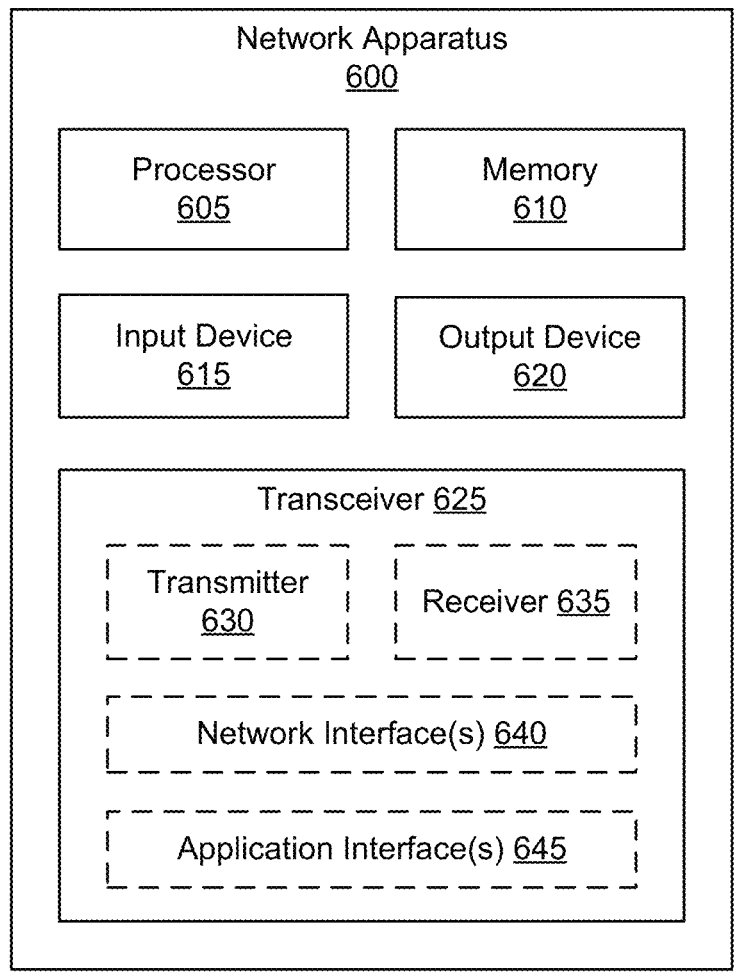
FIG. 6 is a diagram illustrating one embodiment of a network apparatus for determining a maximum power reduction for non-contiguous radio resource allocations.
FIG. 7A is a table illustrating one embodiment of A-MPR requirements for network signaling of "NS_07"

FIG. 6 depicts a network apparatus 600 that may be used for determining a maximum power reduction for non-contiguous radio resource allocations, according to embodiments of the disclosure. In one embodiment, network apparatus 600 may be one implementation of an RAN entity, such as the base unit 110 and/or the gNB 210, as described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

In various embodiments, the processor 605 determines a non-contiguous resource allocation for the UE, the non-contiguous resource allocation comprising a smallest containing contiguous allocation ("SCCA") and a plurality of resource blocks punctured from the SCCA, wherein the SCCA is the smallest set of contiguous resource blocks that encompasses the non-contiguous resource allocation. The processor 605 controls the transceiver 625 to transmit the non-contiguous resource allocation to the UE and to receive, from the UE, an uplink signal on the non-contiguous resource allocation. Here, the uplink signal is transmitted using a first additional maximum power reduction for the non-contiguous resource allocation in response to a fraction of punctured resource blocks from the SCCA being less than a threshold value.

In some embodiments, the non-contiguous resource allocation comprises a plurality of smaller contiguous resource allocations. In some embodiments, the first additional maximum power reduction for the non-contiguous resource allocation is set to an additional maximum power reduction defined for the SCCA in response to the fraction of resource blocks punctured from the SCCA being less than the threshold value. In such embodiments, no additional maximum power reduction is defined for the non-contiguous resource allocation in response to the fraction of resource blocks punctured from the SCCA not being less than the threshold value.

In some embodiments, the first additional maximum power reduction for the non-contiguous resource allocation comprises a selected additional maximum power reduction for the SCCA which is increased by a value $\beta$. In certain embodiments, the value $\beta$ is a function of the fraction of resource blocks punctured from the SCCA. In one embodiment, the value $\beta$ is the negative of 10 times the base 10 logarithm of the fraction of resource blocks punctured from the SCCA. In certain embodiments, the total maximum power reduction for the non-contiguous resource allocation is the greater of the additional maximum power reduction for the non-contiguous resource allocation and a maximum power reduction for the non-contiguous resource allocation.

In some embodiments, the threshold value is based on at least one of: a lowest resource block index of the allocation and a number of resource blocks in the SCCA. In some embodiments, the threshold value is based on at least one of: a center frequency of a carrier to which the non-contiguous resource allocation belongs, and a modulation of the non-contiguous resource allocation. In some embodiments, receiving the uplink signal on the non-contiguous resource allocation using the first additional maximum power reduction comprises receiving the uplink signal using a cyclic prefix orthogonal frequency division multiplexing ("CP-OFDM") waveform.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to mobile operation and/or determining a maximum power reduction for non-contiguous radio resource allocations. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

FIG. 7A depicts one example of a table 700 of additional maximum power reduction ("A-MPR") for a non-contiguous resource allocation. Here, the A-MPR values are used for the case that there are additional emissions restrictions in addition to the normal restrictions on the spectral emissions mask (SEM), adjacent channel leakage ratio (ACLR) limits, in-band emissions limits, and spurious emissions limits. For the case of additional emissions restrictions, the gNB 210 send an indication of the additional emissions restrictions (e.g., an indication of an additional power reduction) to the UE. These additional restrictions may be indicated by network signaling (NS), e.g., by sending a NS value. The UE then determines the A-MPR and the allowed MPR based on the determined A-MPR. In certain embodiments, the determined A-MPR is added to the (normal) allowed MPR for the non-contiguous allocation to arrive at the total MPR. The UE then uses the total MPR when transmitting signals in the network.

For contiguous allocations, MPR for CP-OFDM with contiguous allocations will be specified in the form of table similar to that of Table 700. Here, Table 700 may apply when the network entity (e.g., gNB or other RAN node) signals the value "NS_07". From Table 700, it can be seen that MPR for a contiguous allocation depends on $RB_{START}$, the location of the first RB of the contiguous allocation, and $L_{CRB}$, the number of RBs in the contiguous allocation. In certain embodiments, the A-MPR value may be adjusted by the value β discussed above.

Note that in the Table 700, the parameter '$RB_{START}$' indicates the lowest RB index of transmitted resource blocks and the parameter '$L_{CRB}$' is the length of a contiguous resource block allocation. Note that for intra-subframe frequency hopping which intersects regions, the parameter '$RB_{START}$' and the parameter '$L_{CRB}$' apply on a per slot basis. Additionally, for intra-subframe frequency hopping which intersects regions, the larger A-MPR value may be applied for both slots in the subframe.

FIG. 7B depicts another example of a table 750 of A-MPR for a non-contiguous resource allocation, here associated with a different NS value. In various embodiments, the table 750 may apply when a value of "NS_04" signaled. In the table 750, it can be seen that the MPR depends on $RB_{START}$ and $L_{CRB}$, as in the example above, but also depends on the center frequency of the carrier, $F_c$.

Note that in the Table 750, the parameter '$RB_{START}$' indicates the lowest RB index of transmitted resource blocks and the parameter '$L_{CRB}$' is the length of a contiguous resource block allocation. Note that for intra-subframe frequency hopping which intersects regions, the parameter '$RB_{START}$' and the parameter '$L_{CRB}$' apply on a per slot basis. Additionally, for intra-subframe frequency hopping which intersects regions, the larger A-MPR value may be applied for both slots in the subframe.

Moreover, for NR with CP-OFDM modulation, the MPR tables for contiguous allocations with additional emissions restrictions (indicated using NS signaling) may also depend on the parameters $RB_{START}$, $L_{CRB}$, and $F_c$, in addition to the modulation order.

When NS-signaled additional emissions constraints are used with CP-OFDM modulation, the existing MPR table defined for general emissions requirements may not be sufficient to meet these requirements. Thus, when additional emission requirements are signaled, it may be necessary to define additional MPR tables for CP-OFDM that depend on $RB_{START}$, $L_{CRB}$, and $F_c$, in addition to the modulation order. Examples, of such tables are depicted above, in Tables 700 and 750. From these tables defining MPR for CP-OFDM with additional emissions constraints, it will also be necessary to define MPR for non-contiguous allocations due to the need to puncture out the PUCCH region of bandwidth parts which lie within the full channel bandwidth as shown in FIG. 3.

It can be noted that in different regions of these tables, different emissions constraints may limit the power that can be transmitted and thus determine the required MPR. For example, for higher order modulations such as 64-QAM, it may be that in-band emissions requirements are the gating factor on the amount of power that can be transmitted. Conversely for large allocations, the ACLR requirements may limit the transmit power. Thus, in different regions of the table, it may be possible to puncture a smaller or larger number of RBs and still meet emissions requirements. Thus, the fraction of RBs a that can be punctured from the allocation while still meeting emissions requirements will depend on the region of the table as determined by the parameters $RB_{START}$, $L_{CRB}$, and $F_c$, in addition to the modulation order. A non-contiguous allocation has a span of $L_{CRB}$, where $L_{CRB}$ is the number of RBs in the smallest contiguous allocation containing the non-contiguous allocation.

Figure 8:
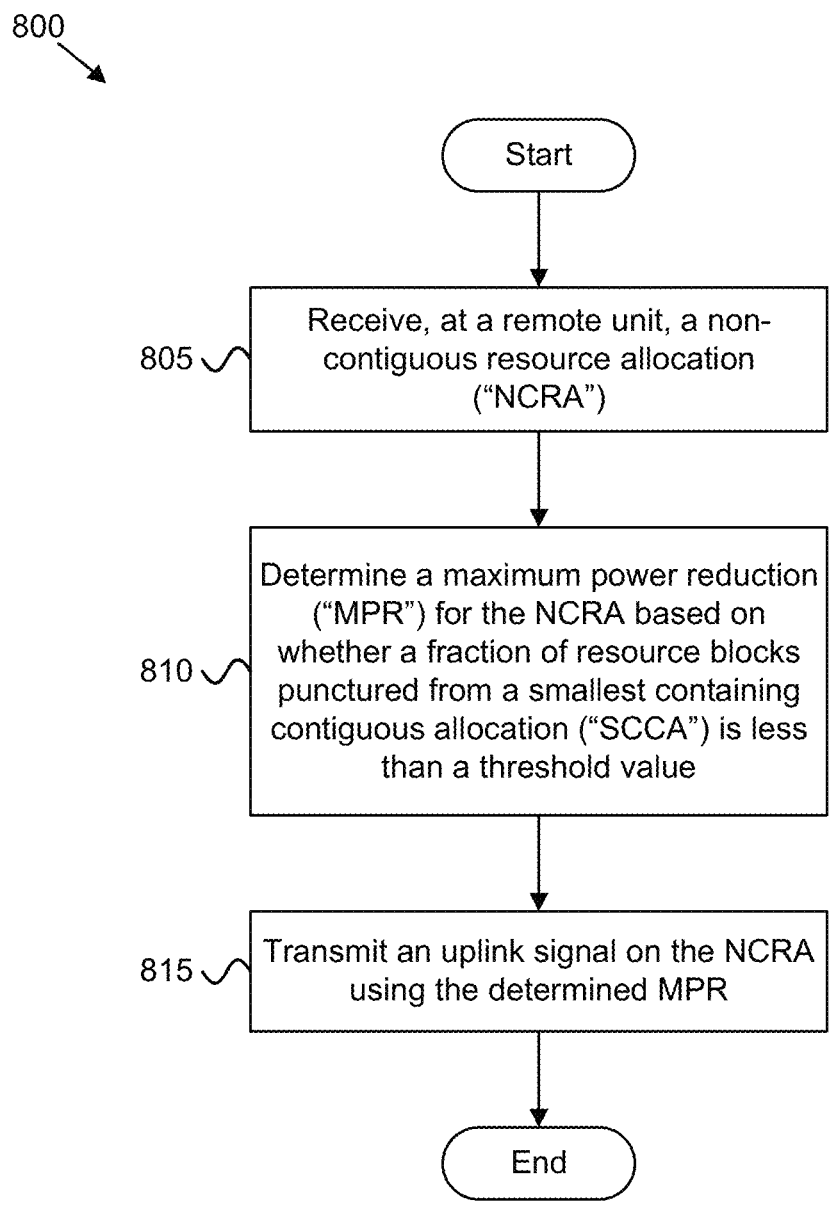
FIG. 8 is a flow chart diagram illustrating one embodiment of a method for determining a maximum power reduction for a non-contiguous radio resource allocation.

FIG. 8 is a flowchart diagram of a method 800 for determining an MPR fora non-contiguous allocation. In various embodiments, the method 800 is performed by a UE, such as the remote unit 105, the UE 205, and/or the user equipment apparatus 400, described above. In some embodiments, the method 800 is performed by a processor, such as a microcontroller, a microprocessor, a CPU, a GPU, an auxiliary processing unit, a FPGA, or the like.

The method 800 includes receiving 805, at a remote unit in a wireless communication system, a non-contiguous resource allocation. The method 800 includes determining 810 a maximum power reduction for the non-contiguous resource allocation based on whether a fraction of resource blocks punctured from a smallest containing contiguous allocation ("SCCA") is less than a threshold α. The method

800 also includes transmitting 815 an uplink signal on the non-contiguous resource allocation using the determined maximum power reduction.

Figure 9:
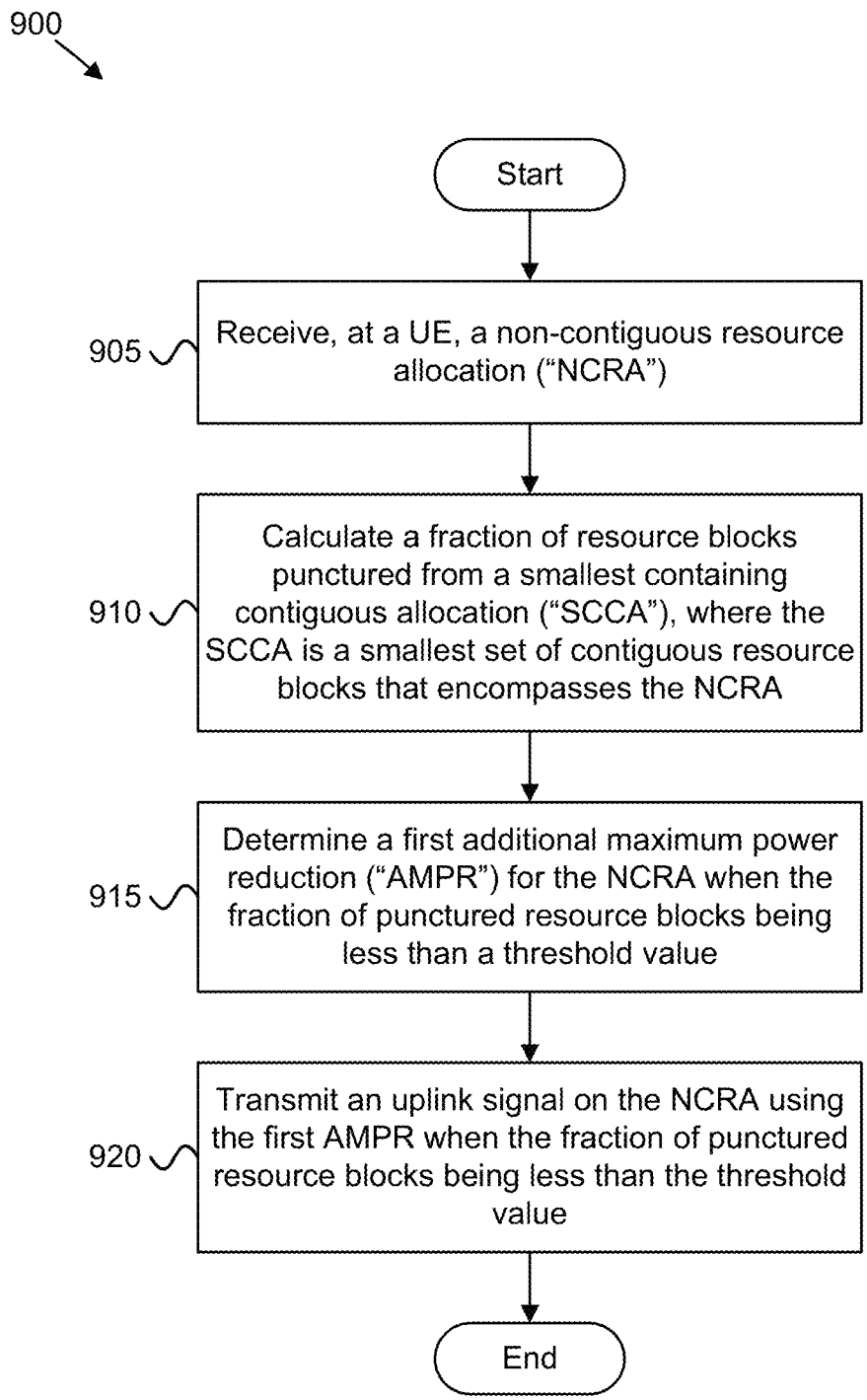
FIG. 9 is a flow chart diagram illustrating one embodiment of a method for determining additional maximum power reduction for a non-contiguous radio resource allocation.

FIG. 9 depicts one embodiment of a method 900 for determining an AMPR for a non-contiguous allocation scheduling a sidelink transmission, according to embodiments of the disclosure. In various embodiments, the method 900 is performed by a UE, such as the remote unit 105, the UE 205, and/or the user equipment apparatus 400, described above. In some embodiments, the method 900 is performed by a processor, such as a microcontroller, a microprocessor, a CPU, a GPU, an auxiliary processing unit, a FPGA, or the like.

The method 900 begins and receives 905 a non-contiguous resource allocation. The method 900 includes calculating 910 a fraction of resource blocks punctured from a SCCA, where the SCCA is the smallest set of contiguous resource blocks that encompasses the non-contiguous resource allocation includes determining 915 a first additional maximum power reduction for the non-contiguous resource allocation when the fraction of punctured resource blocks being less than a threshold value (i.e., the threshold 'α' described above). The method 900 also includes transmitting 920 an uplink signal on the non-contiguous resource allocation using the first additional maximum power reduction when the fraction of punctured resource blocks being less than the threshold value.

Figure 10:
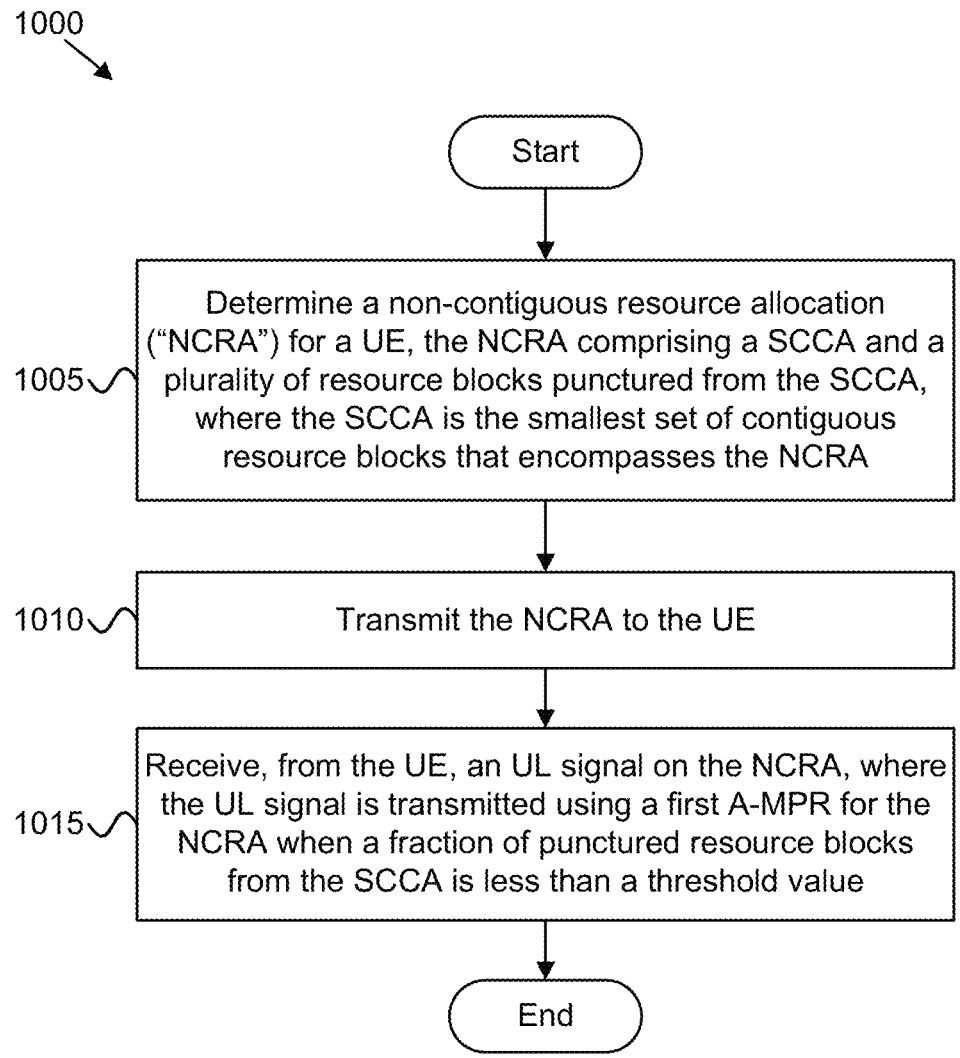
FIG. 10 is a flow chart diagram illustrating another embodiment of a method for determining an additional maximum power reduction for a non-contiguous radio resource allocation.

FIG. 10 depicts one embodiment of a method 1000 for determining an AMPR for a non-contiguous allocation scheduling a sidelink transmission, according to embodiments of the disclosure. In various embodiments, the method 1000 is performed by a RAN entity in a wireless communication system, such as the base unit 110, the gNB 210, and/or the network apparatus 600, described above. In some embodiments, the method 1000 is performed by a processor, such as a microcontroller, a microprocessor, a CPU, a GPU, an auxiliary processing unit, a FPGA, or the like.

The method 1000 begins and determines 1005 a non-contiguous resource allocation for a UE in a wireless communication system. Here, the non-contiguous resource allocation comprises a SCCA and a plurality of resource blocks punctured from the SCCA, where the SCCA is the smallest set of contiguous resource blocks that encompasses the non-contiguous resource allocation. The method 1000 includes transmitting 1010 the non-contiguous resource allocation to the UE. The method 1000 includes receiving 1015, from the UE, an uplink signal on the non-contiguous resource allocation, where the uplink signal is transmitted using a first additional maximum power reduction for the non-contiguous resource allocation when a fraction of punctured resource blocks from the SCCA is less than a threshold value.

Disclosed herein is a first apparatus for determining a maximum power reduction for non-contiguous radio resource allocations. The first apparatus may be implemented by a user terminal, such as the base unit 110, the gNB 210, and/or the network apparatus 600. The first apparatus includes a processor and a transceiver that communicates with a User Equipment ("UE") in a wireless communication system. The processor determines a non-contiguous resource allocation for the UE, the non-contiguous resource allocation comprising a smallest containing contiguous allocation ("SCCA") and a plurality of resource blocks punctured from the SCCA, wherein the SCCA is the smallest set of contiguous resource blocks that encompasses the non-contiguous resource allocation. The processor controls the transceiver to transmit the non-contiguous resource allocation to the UE and to receive, from the UE, an uplink signal on the non-contiguous resource allocation. Here, the uplink signal is transmitted using a first additional maximum power reduction for the non-contiguous resource allocation in response to a fraction of punctured resource blocks from the SCCA being less than a threshold value.

In some embodiments, the non-contiguous resource allocation comprises a plurality of smaller contiguous resource allocations. In some embodiments, the first additional maximum power reduction for the non-contiguous resource allocation is set to an additional maximum power reduction defined for the SCCA in response to the fraction of resource blocks punctured from the SCCA being less than the threshold value. In such embodiments, no additional maximum power reduction is defined for the non-contiguous resource allocation in response to the fraction of resource blocks punctured from the SCCA not being less than the threshold value.

In some embodiments, the first additional maximum power reduction for the non-contiguous resource allocation comprises a selected additional maximum power reduction for the SCCA which is increased by a value β. In certain embodiments, the value β is a function of the fraction of resource blocks punctured from the SCCA. In one embodiment, the value β is the negative of 10 times the base 10 logarithm of the fraction of resource blocks punctured from the SCCA. In certain embodiments, the total maximum power reduction for the non-contiguous resource allocation is the greater of the additional maximum power reduction for the non-contiguous resource allocation and a maximum power reduction for the non-contiguous resource allocation.

In some embodiments, the threshold value is based on at least one of: a lowest resource block index of the allocation and a number of resource blocks in the SCCA. In some embodiments, the threshold value is based on at least one of: a center frequency of a carrier to which the non-contiguous resource allocation belongs, and a modulation of the non-contiguous resource allocation. In some embodiments, receiving the uplink signal on the non-contiguous resource allocation using the first additional maximum power reduction comprises receiving the uplink signal using a cyclic prefix orthogonal frequency division multiplexing ("CP-OFDM") waveform.

Disclosed herein is a first method for determining a maximum power reduction for a non-contiguous resource allocation. The method may be performed by a RAN node, such as the base unit 110, the gNB 210, and/or the network apparatus 600. The first method includes determining a non-contiguous resource allocation for a UE in a wireless communication system, the non-contiguous resource allocation comprising a SCCA and a plurality of resource blocks punctured from the SCCA, where the SCCA is the smallest set of contiguous resource blocks that encompasses the non-contiguous resource allocation. The first method includes transmitting the non-contiguous resource allocation to the UE and receiving, from the UE, an uplink signal on the non-contiguous resource allocation, where the uplink signal is transmitted using a first additional maximum power reduction for the non-contiguous resource allocation in response to a fraction of punctured resource blocks from the SCCA being less than a threshold value.

In some embodiments, the non-contiguous resource allocation comprises a plurality of smaller contiguous resource allocations. In some embodiments, the first additional maximum power reduction for the non-contiguous resource allocation is set to an additional maximum power reduction defined for the SCCA in response to the fraction of resource blocks punctured from the SCCA being less than the threshold value. In such embodiments, no additional maximum power reduction is defined for the non-contiguous resource allocation in response to the fraction of resource blocks punctured from the SCCA not being less than the threshold value.

In some embodiments, the first additional maximum power reduction for the non-contiguous resource allocation comprises a selected additional maximum power reduction for the SCCA which is increased by a value β. In certain embodiments, the value β is a function of the fraction of resource blocks punctured from the SCCA. In one embodiment, the value β is the negative of 10 times the base 10 logarithm of the fraction of resource blocks punctured from the SCCA. In certain embodiments, the total maximum power reduction for the non-contiguous resource allocation is the greater of the additional maximum power reduction for the non-contiguous resource allocation and a maximum power reduction for the non-contiguous resource allocation.

In some embodiments, the threshold value is based on at least one of: a lowest resource block index of the allocation and a number of resource blocks in the SCCA. In some embodiments, the threshold value is based on at least one of: a center frequency of a carrier to which the non-contiguous resource allocation belongs, and a modulation of the non-contiguous resource allocation. In some embodiments, receiving the uplink signal on the non-contiguous resource allocation using the first additional maximum power reduction comprises receiving the uplink signal using a cyclic prefix orthogonal frequency division multiplexing ("CP-OFDM") waveform.

Disclosed herein is a second apparatus for determining a maximum power reduction for non-contiguous radio resource allocations. The second apparatus may be implemented by a user terminal, such as the remote unit 105, the UE 205, and/or the user equipment apparatus 400. The second apparatus includes a processor that identifies a received non-contiguous resource allocation and determines a maximum power reduction for the non-contiguous resource allocation based on whether a fraction of resource blocks punctured from a smallest containing contiguous allocation ("SCCA") is less than a threshold value. The second apparatus includes a transceiver that transmits an uplink signal on the non-contiguous resource allocation using the determined maximum power reduction.

In various embodiments, the SCCA is a set of contiguous resource block that encompasses the non-contiguous resource allocation, wherein the non-contiguous resource allocation contains a plurality of smaller contiguous resource allocations. In certain embodiments, the threshold α is based on at least one of: a lowest resource block index of the allocation and a number of resource blocks in the SCCA. In certain embodiments, the threshold α is based on at least one of: a center frequency of a carrier to which the non-contiguous resource allocation belongs, and a modulation of the non-contiguous resource allocation.

In certain embodiments, determining the maximum power reduction for the non-contiguous resource allocation includes increasing a selected maximum power reduction for the SCCA by a value β. In certain embodiments, the value β is a function of the fraction of resource blocks punctured from the SCCA. In one embodiment, the value β is the negative of 10 times the base 10 logarithm of the fraction of resource blocks punctured from the SCCA.

In some embodiments, determining a maximum power reduction for the non-contiguous resource allocation includes: a) selecting a maximum power reduction defined for the SCCA as the MPR for the entire non-contiguous resource allocation in response to the fraction of resource blocks punctured from the SCCA being less than the threshold value, and b) selecting no maximum power reduction defined for the SCCA as the MPR for the entire non-contiguous resource allocation in response to the fraction of resource blocks punctured from the SCCA not being less than the threshold value.

In some embodiments the transceiver receives an indication of an additional power reduction from a wireless communication system. In such embodiments, transmitting the uplink signal on the non-contiguous resource allocation using the determined maximum power reduction includes further reducing output power based on the indication. In some embodiments, transmitting the uplink signal on the non-contiguous resource allocation using the maximum power reduction includes the transceiver transmitting the uplink signal using a cyclic prefix orthogonal frequency division multiplexing ("CP-OFDM") waveform.

Disclosed herein is a second method for determining a maximum power reduction for non-contiguous radio resource allocations. The second method may be performed by a user terminal, such as the remote unit 105, the UE 205, and/or the user equipment apparatus 400. The second method includes receiving, at a remote unit in a wireless communication system, a non-contiguous resource allocation and determining a maximum power reduction for the non-contiguous resource allocation based on whether a fraction of resource blocks punctured from a smallest containing contiguous allocation ("SCCA") is less than a threshold value. The method includes transmitting an uplink signal on the non-contiguous resource allocation using the determined maximum power reduction.

In various embodiments, the SCCA is a set of contiguous resource block that encompasses the non-contiguous resource allocation, wherein the non-contiguous resource allocation includes a plurality of smaller contiguous resource allocations. In certain embodiments, the threshold α is based on at least one of: a lowest resource block index of the allocation and a number of resource blocks in the SCCA. In certain embodiments, the threshold α is based on at least one of: a center frequency of a carrier to which the non-contiguous resource allocation belongs, and a modulation of the non-contiguous resource allocation.

In certain embodiments, determining the maximum power reduction for the non-contiguous resource allocation includes increasing a selected maximum power reduction for the SCCA by a value β. In certain embodiments, the value β is a function of the fraction of resource blocks punctured from the SCCA. In one embodiment, the value β is the negative of 10 times the base 10 logarithm of the fraction of resource blocks punctured from the SCCA.

In some embodiments, determining a maximum power reduction for the non-contiguous resource allocation includes: a) selecting a maximum power reduction defined for the SCCA as the MPR for the entire non-contiguous resource allocation in response to the fraction of resource blocks punctured from the SCCA being less than the threshold value, and b) selecting no maximum power reduction defined for the SCCA as the MPR for the entire non-contiguous resource allocation in response to the fraction of resource blocks punctured from the SCCA not being less than the threshold value.

In some embodiments the second method includes receiving an indication of an additional power reduction from a wireless communication system. In such embodiments, transmitting the uplink signal on the non-contiguous resource allocation using the determined maximum power reduction includes further reducing output power based on the indication. In some embodiments, transmitting the uplink signal on the non-contiguous resource allocation using the maximum power reduction includes transmitting the uplink signal using a cyclic prefix orthogonal frequency division multiplexing ("CP-OFDM") waveform.

Disclosed herein is a third apparatus for determining a maximum power reduction for non-contiguous radio resource allocations. The third apparatus may be implemented by a user terminal, such as the remote unit 105, the UE 205, and/or the user equipment apparatus 400. The third apparatus includes a processor that receives a non-contiguous resource allocation and calculates a fraction of resource block punctured from a smallest containing contiguous allocation ("SCCA"). Here, the SCCA is the smallest set of contiguous resource blocks that encompasses the non-contiguous resource allocation. The processor determines a first additional maximum power reduction for the non-contiguous resource allocation in response to the fraction of punctured resource blocks being less than a threshold value. The third apparatus includes a transceiver that transmits an uplink signal on the non-contiguous resource allocation using the first additional maximum power reduction in response to the fraction of punctured resource blocks being less than the threshold value.

In some embodiments, the non-contiguous resource allocation includes a plurality of smaller contiguous resource allocations. In some embodiments, determining the first additional maximum power reduction for the non-contiguous resource allocation includes selecting an additional maximum power reduction defined for the SCCA as the additional maximum power reduction for the entire non-contiguous resource allocation in response to the fraction of resource blocks punctured from the SCCA being less than the threshold value. In such embodiments, no additional maximum power reduction is defined for the non-contiguous resource allocation in response to the fraction of resource blocks punctured from the SCCA not being less than the threshold value.

In various embodiments, determining the first additional maximum power reduction for the non-contiguous resource allocation includes increasing a selected additional maximum power reduction for the SCCA by a value β. In certain embodiments, the value β is a function of the fraction of resource blocks punctured from the SCCA. In one embodiment, the value β is the negative of 10 times the base 10 logarithm of the fraction of resource blocks punctured from the SCCA. In certain embodiments, the total maximum power reduction for the non-contiguous resource allocation is the maximum of the additional maximum power reduction for the non-contiguous resource allocation and the maximum power reduction for the non-contiguous resource allocation.

In some embodiments, the threshold value is based on at least one of: a lowest resource block index of the allocation and a number of resource blocks in the SCCA. In some embodiments, the threshold value is based on at least one of: a center frequency of a carrier to which the non-contiguous resource allocation belongs, and a modulation of the non-contiguous resource allocation.

In some embodiments, transmitting an uplink signal on the non-contiguous resource allocation using the first additional maximum power reduction includes transmitting the uplink signal using a CP-OFDM waveform.

Disclosed herein is a third method for determining a maximum power reduction for non-contiguous radio resource allocations. The third method may be performed by a user terminal, such as the remote unit 105, the UE 205, and/or the user equipment apparatus 400. The third method includes receiving—at the user terminal—a non-contiguous resource allocation and calculating—by the user terminal—a fraction of resource block punctured from a smallest containing contiguous allocation ("SCCA"). Here, the SCCA is the smallest set of contiguous resource blocks that encompasses the non-contiguous resource allocation. The third method includes determining—by the user terminal—a first additional maximum power reduction for the non-contiguous resource allocation in response to the fraction of punctured resource blocks being less than a threshold value. The third method includes transmitting—by the user terminal—an uplink signal on the non-contiguous resource allocation using the first additional maximum power reduction in response to the fraction of punctured resource blocks being less than the threshold value.

In some embodiments, the non-contiguous resource allocation includes a plurality of smaller contiguous resource allocations. In some embodiments, determining the first additional maximum power reduction for the non-contiguous resource allocation includes selecting an additional maximum power reduction defined for the SCCA as the additional maximum power reduction for the entire non-contiguous resource allocation in response to the fraction of resource blocks punctured from the SCCA being less than the threshold value. In such embodiments, no additional maximum power reduction is defined for the non-contiguous resource allocation in response to the fraction of resource blocks punctured from the SCCA not being less than the threshold value.

In various embodiments, determining the first additional maximum power reduction for the non-contiguous resource allocation includes increasing a selected additional maximum power reduction for the SCCA by a value β. In certain embodiments, the value β is a function of the fraction of resource blocks punctured from the SCCA. In one embodiment, the value β is the negative of 10 times the base 10 logarithm of the fraction of resource blocks punctured from the SCCA. In certain embodiments, the total maximum power reduction for the non-contiguous resource allocation is the maximum of the additional maximum power reduction for the non-contiguous resource allocation and the maximum power reduction for the non-contiguous resource allocation.

In some embodiments, the threshold value is based on at least one of: a lowest resource block index of the allocation and a number of resource blocks in the SCCA. In some embodiments, the threshold value is based on at least one of: a center frequency of a carrier to which the non-contiguous resource allocation belongs, and a modulation of the non-contiguous resource allocation.

In some embodiments, transmitting an uplink signal on the non-contiguous resource allocation using the first additional maximum power reduction includes transmitting the uplink signal using a CP-OFDM waveform.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining a non-contiguous resource allocation for a User Equipment ("UE") in a wireless communication system, the non-contiguous resource allocation comprising a smallest containing contiguous allocation ("SCCA") and a plurality of resource blocks punctured from the SCCA, wherein the SCCA is a smallest set of contiguous resource blocks that encompasses the non-contiguous resource allocation;
   transmitting the non-contiguous resource allocation to the UE; and
   receiving, from the UE, an uplink signal on the non-contiguous resource allocation, wherein the uplink signal is transmitted using a first additional maximum power reduction for the non-contiguous resource allocation in response to a fraction of punctured resource blocks from the SCCA being less than a threshold value.

2. The method of claim 1, wherein the non-contiguous resource allocation comprises a plurality of smaller contiguous resource allocations.

3. The method of claim 1,
   wherein the first additional maximum power reduction for the non-contiguous resource allocation is set to an additional maximum power reduction defined for the SCCA in response to the fraction of resource blocks punctured from the SCCA being less than the threshold value, and
   wherein no additional maximum power reduction is defined for the non-contiguous resource allocation in response to the fraction of resource blocks punctured from the SCCA not being less than the threshold value.

4. The method of claim 1, wherein the first additional maximum power reduction for the non-contiguous resource allocation comprises a selected additional maximum power reduction for the SCCA which is increased by a value $\beta$.

5. The method of claim 4, wherein the value $\beta$ is a function of the fraction of resource blocks punctured from the SCCA.

6. The method of claim 5, wherein the value $\beta$ is the negative of 10 times the base 10 logarithm of the fraction of resource blocks punctured from the SCCA.

7. The method of claim 4, wherein the total maximum power reduction for the non-contiguous resource allocation is the greater of the additional maximum power reduction for the non-contiguous resource allocation and a maximum power reduction for the non-contiguous resource allocation.

8. The method of claim 1, wherein the threshold value is based on at least one of: a lowest resource block index of the allocation and a number of resource blocks in the SCCA.

9. The method of claim 1, wherein the threshold value is based on at least one of: a center frequency of a carrier to which the non-contiguous resource allocation belongs, and a modulation of the non-contiguous resource allocation.

10. The method of claim 1, wherein receiving the uplink signal on the non-contiguous resource allocation using the first additional maximum power reduction comprises receiving the uplink signal using a cyclic prefix orthogonal frequency division multiplexing ("CP-OFDM") waveform.

11. An apparatus comprising:
    a transceiver that communicates with a User Equipment ("UE") in a wireless communication system; and
    a processor that:
    determines a non-contiguous resource allocation for the UE, the non-contiguous resource allocation comprising a smallest containing contiguous allocation ("SCCA") and a plurality of resource blocks punctured from the SCCA, wherein the SCCA is a smallest set of contiguous resource blocks that encompasses the non-contiguous resource allocation;
    transmits the non-contiguous resource allocation to the UE; and
    receives, from the UE, an uplink signal on the non-contiguous resource allocation, wherein the uplink signal is transmitted using a first additional maximum power reduction for the non-contiguous resource allocation in response to a fraction of punctured resource blocks from the SCCA being less than a threshold value.

12. The apparatus of claim 11, wherein the non-contiguous resource allocation comprises a plurality of smaller contiguous resource allocations.

13. The apparatus of claim 11,
    wherein the first additional maximum power reduction for the non-contiguous resource allocation is set to an additional maximum power reduction defined for the SCCA in response to the fraction of resource blocks punctured from the SCCA being less than the threshold value; and
    wherein no additional maximum power reduction is defined for the non-contiguous resource allocation in response to the fraction of resource blocks punctured from the SCCA not being less than the threshold value.

14. The apparatus of claim 11, wherein the first additional maximum power reduction for the non-contiguous resource allocation comprises a selected additional maximum power reduction for the SCCA which is increased by a value $\beta$.

15. The apparatus of claim 14, wherein the value $\beta$ is a function of the fraction of resource blocks punctured from the SCCA.

16. The apparatus of claim 15, wherein the value $\beta$ is the negative of 10 times the base 10 logarithm of the fraction of resource blocks punctured from the SCCA.

17. The apparatus of claim 14, wherein the total maximum power reduction for the non-contiguous resource allocation is the greater of the additional maximum power reduction for the non-contiguous resource allocation and a maximum power reduction for the non-contiguous resource allocation.

18. The apparatus of claim 11, wherein the threshold value is based on at least one of: a lowest resource block index of the allocation and a number of resource blocks in the SCCA.

19. The apparatus of claim 11, wherein the threshold value is based on at least one of: a center frequency of a carrier to which the non-contiguous resource allocation belongs, and a modulation of the non-contiguous resource allocation.

20. The apparatus of claim 11, wherein receiving the uplink signal on the non-contiguous resource allocation using the first additional maximum power reduction comprises receiving the uplink signal using a cyclic prefix orthogonal frequency division multiplexing ("CP-OFDM") waveform.

* * * * *